INVENTORS
GEORGE P. KEFALAS
ROBERT E. MALLISON
ARTHUR A. SEGAL
Michael A. Silva, Jr.
ATTORNEY INVENTORS
GEORGE P. KEFALAS
ROBERT E. MALLISON
ARTHUR A. SEGAL
Michael A. Siley
ATTORNEY Sept. 5, 1967 G. P. KEFALAS ET AL 3,340,531

SATELLITE COMMUNICATION SYSTEM

Filed Oct. 5, 1964

4 Sheets-Sheet 3

INVENTORS
GEORGE P. KEFALAS
ROBERT E. MALLISON
ARTHUR A. SEGAL

Michael A. Sileo Jr.
ATTORNEY

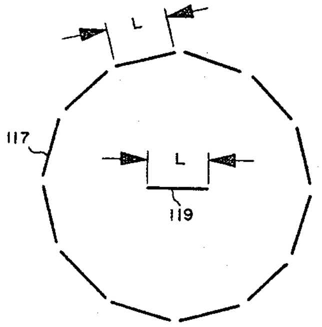
FIG. 7
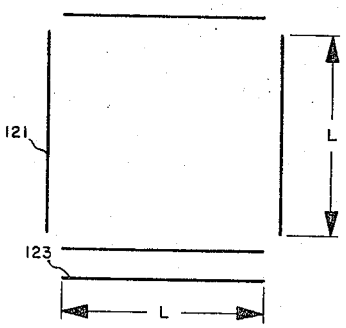
FIG. 9
| | FREQUENCY (gc) | GAIN (db) | N | $N_{TOTAL}$ | L (FT) |
|---|---|---|---|---|---|
| RECEIVE | 7 | 31.0 SIDE<br>28.5 OVER | 64 | 832 | 18.0 |
| | 4 | 24.5 SIDE<br>22.0 OVER | 16 | 208 | 7.5 |
| TRANSMIT | 8 | 25.0 SIDE<br>22.5 OVER | 16 | 208 | 3.75 |
| | 6 | 22.0 SIDE<br>19.5 OVER | 8 | 104 | 2.33 |
FIG. 8
| | FREQUENCY (gc) | GAIN (db) | N | $N_{TOTAL}$ | L(FT) |
|---|---|---|---|---|---|
| RECEIVE | 4 | 24.5 SIDE<br>22.0 OVER | 32 | 160 | 16.9 |
| TRANSMIT | 6 | 21.5 SIDE<br>19.0 OVER | 16 | 80 | 5.45 |
FIG. 10
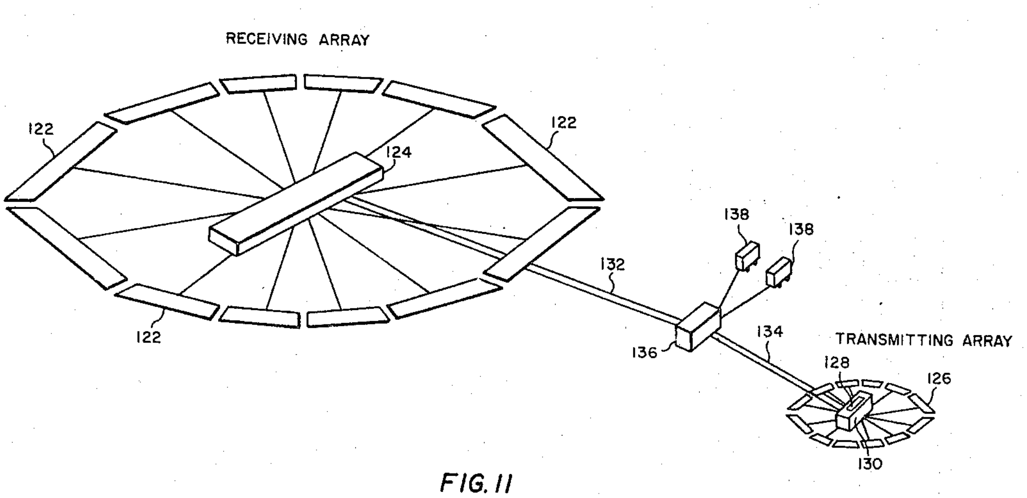
FIG. 11
INVENTORS
GEORGE P. KEFALAS
ROBERT E. MALLISON
ARTHUR A. SEGAL
BY Michael A. Sdeo
ATTORNEY United States Patent Office 3,340,531

Patented Sept. 5, 1967

3,340,531

SATELLITE COMMUNICATION SYSTEM

George P. Kefalas, Robert E. Mallison, and Arthur A. Segal, Orange County, Fla., assignors to Martin-Marietta Corporation, Middle River, Md., a corporation of Maryland Filed Oct. 5, 1964, Ser. No. 401,360
15 Claims. (Cl. 343—100)

This invention relates to a satellite communication system of the type in which a plurality of transportable ground terminals positioned on the earth's surface are inter-linked by a plurality of satellites orbiting about the earth, and more particularly to a medium-orbit, active, satellite communication system utilizing a linear phased array receive and transmit antenna network in each ground terminal for providing receive and transmit patterns which can be accurately scanned and tracked over the complete visible hemisphere. Our system is advantageously capable of simultaneously acquiring and tracking a plurality of satellites for simultaneously establishing a plurality of inter-communication links between the ground terminals of the system, and is uniquely capable of instantaneous "handover" from satellite to communicating ground terminals, yet not requiring ephemeris data with respect to satellite position as a function of time.

In an active medium-orbit satellite communication system, each of the ground terminals communicates with any other ground terminal by way of satellite repeaters. That is to say, when one ground terminal attempts to communicate with any one or more of the other ground terminals of the system, it transmits its message or data to a preselected orbiting satellite, which satellite in return repeats or retransmits such message or data to the appropirate ground terminal(s). In order to assure continuous or uninterrupted world-wide communication between ground terminals, each ground terminal must be capable of simultaneously acquiring and tracking several satellites, whether such satellites are in the same or different orbits, and must be capable of instantaneous "handover" from satellite to satellite as each satellite moves out of the field of view of the communicating ground terminals. To say it otherwise, so long as one satellite is in the field of view of all of the communicating ground terminals, it may be used as the inter-communication link between such ground terminals; but the system must be capable of switching to another satellite in the field of view of such communicating ground terminals when the first satellite moves out of their field of view. It is also highly desirable that all ground terminals of the system be capable of inter-communication without ephemeris data respecting satellite position as a function of time, in order that such satellites may be accurately usable as inter-communicating links between the ground terminals of the system. This latter feature is particularly advantageous in strategic military communication systems of the type requiring frequent deployment of the ground terminals over large geographical areas.

In prior known satellite communication systems the ground terminals have utilized large parabolic or horn antennas. Although these antennas are efficient to some degree, they can only communicate with one satellite at a time, and each ground terminal must be located at preselected and specially prepared sites.

In general, prior known satellite communication systems require at least one parabolic or horn type antenna at each ground terminal to acquire and track each orbiting satellite in its field of view for providing simultaneous inter-communication with more than one remote ground terminal of the system. In addition, each of such antennas must be diplexed for receiving and transmitting, and additional diplexed antennas are required to achieve instantaneous "handover" in each inter-communication link between the ground terminals. Further, each of the antennas depend upon accurate ephemeris data, respecting satellite position as a function of time, for acquiring and tracking the orbiting satellites, and this data must undergo coordinate transformation when the ground terminals are relocated to a new site.

Accordingly, there exists a present and apparent need for a satellite system capable of providing world-wide inter-communication between transportable ground terminals, yet not require ephemeris data with respect to satellite position as a function of time. In addition, such system should be small and light so that it can be readily moved, and accordingly relatively inexpensive so that it is scientifically competitive with existing world-wide communication systems and techniques. The present invention provides these advantageous features.

In accordance with the present invention a plurality of transportable ground terminals positioned on the earth's surface are linked together by a plurality of satellites orbiting about the earth. Each satellite of the system continuously transmits an identifying signal or beacon code which distinguishes each satellite from each other satellite. The ground terminals of the system are each provided with a linear phased array antenna network, consisting of separate receive and transmit arrays, for providing receive and transmit patterns which can be accurately scanned and tracked over the complete visible hemisphere. A programmer is provided in each ground terminal of the system for electronically steering both the receive and transmit array beams so that each ground terminal is capable of tracking any satellite of the system which is in its field of view. By virtue of this feature an appropriate satellite may be subsequently selected as the communication relay or link between communicating ground terminals.

When one ground terminal attempts to communicate with another ground terminal, it first scans or searches for all satellites in its field of view. This is called the acquisition mode. During this mode of the system, the programmer is adapted to sequentially sample each port or terminal of the receive array and to appropriately couple all received beacon codes to a receive RF switching network. The programmer then routes such received beacon codes through the receiving RF switching network to an acquisition and tracking receiver circuit, which circuit is adapted to decode the beacon and to decide whether it is the beacon code of a satellite capable of linking the "calling" ground terminal with the "called" ground terminal. The acquisition and tracking circuit is also capable of appropriately notifying the programmer that it has found a desired satellite for communicating with the "called" or preselected remote ground terminal(s).

Simultaneously with the sequential sampling of the receive array, the programmer electronically steers the transmit array via a transmit RF switching network. Thus, during the acquisition mode of the system when a desired satellite is selected, the transmitting portion of each of the communicating ground terminals is placed in condition to transmit intelligence to the selected satellite for re-transmission.

During the transmitting mode, the programmer selects one of the available transmitting channels and appropriately couples the intelligence to be transmitted through the transmit RF switching network to the transmit antenna array. Each ground terminal also includes a voice and teletype input/output network for processing both intelligence received and intelligence to be transmitted. In this connection, the programmer not only selects an available receive channel for routing intelligence received to the voice and teletype input/output network, but also appropriately selects the transmit channel for routing intelligence from the voice and teletype input/output network to the transmit antenna.

The present invention is also capable of acquiring and tracking other satellites at the same time that the system is receiving intelligence from and transmitting intelligence to a preselected satellite. That is to say, while certain ground terminals are communicating via one or more selected satellites in their field of view, they can simultaneously acquire and track another satellite which will be in their field of view when the first satellite moves out of the field of view of any one of these communicating ground terminals. This latter feature is provided by transmitting "handover" signals between the communicating ground terminals shortly before the selected satellite is about to move out of the field of view of any one of the communicating ground terminals. Thus, shortly before the selected satellite moves out of the field of view of any one of the communicating ground terminals, the programmer commands the system to transmit a "handover" signal which causes the communicating ground terminals to acquire and track the next satellite that will be in their mutual field of view, and to correspondingly switch to this new satellite when the first satellite moves out of their mutual field of view.

In addition to the foregoing characteristics and features of the present invention, each ground terminal is capable of simultaneously acquiring and tracking a plurality of satellites in the system, thus establishing a plurality of available communication links between the ground terminals of the system. Thus, any ground terminal is uniquely capable of simultaneously communicating with a number of other ground terminals via these plural communication links. Each ground terminal may transmit the same message over each of such plural communication links or it may transmit a number of separate messages depending, of course, upon its channel and frequency capacity.

It should be noted here that the ulitization of electronically steerable antennas advantageously permits the satellite communication system to meet the rigid requirements of simultaneous multiple satellite handling of each ground terminal within the system. In particular, linear arrays, such as the type described in the Warren A. Birge patent application, Ser. No. 290,453, filed June 25, 1963, now Patent No. 3,270,336, entitled, "Antenna Scanning System," which is assigned to the assignee of the present invention, may be employed in the satellite communication system of the present invention, with the resulting advantages of (1) implementation simplicity for transportability and low cost, (2) rapid volumetric scanning capability, (3) simplicity in the electronic steering mechanism, (4) independence of and operation without ephemeris input on satellite position as a function of time, and (5) ready growth potential for handling more satellites per ground terminal. Further, significant advantages are achieved in the use of linear grating-lobe arrays, both as to implementation and alignment, and also as to the necessary and desired beam-width requirement for a given gain or number of elements while yet matching the rapid volumetric scan capability of conventional arrays.

It is accordingly a primary object of the present invention to provide a satellite communication system in which each of the ground terminals communicates with any other ground terminal by way of satellite repeaters.

It is another object of the present invention to provide a satellite communication system in which each ground terminal is capable of simultaneously acquiring and tracking several satellites, whether such satellites are in the same or different orbits, and capable of instantaneous "handover" from satellite to satellite as each satellite moves out of the field of view of the communicating ground terminals.

It is another object of the present invention to provide a satellite communication system comprising a plurality of ground terminals geographically spaced on the earth's surface and a plurality of satellites orbiting about the earth in various orbits, whereby inter-communication between any one or more ground terminals can be accurately achieved without ephemeris data as to satellite position with respect to time.

It is another object of the present invention to provide a satellite communication system which uniquely utilizes linear phased array antennas in each ground terminal of the system.

It is another object of the present invention to provide a satellite communication system which utilizes electronically steerable antennas in each ground terminal of the system.

It is another object of the present invention to provide a satellite communication system in which each ground terminal of the system is uniquely capable of simultaneously acquiring and tracking a plurality of satellites for simultaneously establishing a plurality of inter-communication links between the ground terminals of the system.

These and further objects and advantages of the present invention will become more apparent upon reference to the following description and claims and the appended drawings, wherein:

FIGURE 7 depicts one embodiment of an antenna array in accordance with the present invention;

FIGURE 8 is a table showing certain pertinent conditions and parameters of the antenna array of FIGURE 7;

FIGURE 9 depicts another embodiment of an antenna array in accordance with the present invention;

FIGURE 10 is a table showing certain pertinent conditions and parameters of the antenna array of FIGURE 9; and FIGURE 11 is an isometric view of a ground terminal showing polygon shaped receive and transmit arrays and a control center.

Figure 1:
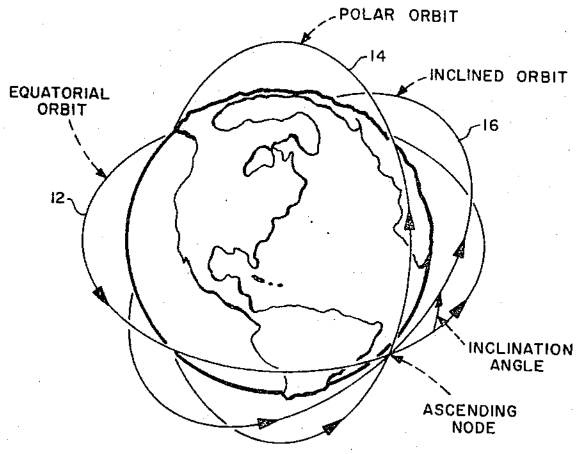
FIGURE 1 is an isometric view of the earth showing an equatorial, polar and inclined orbit about the earth.
Figure 2:
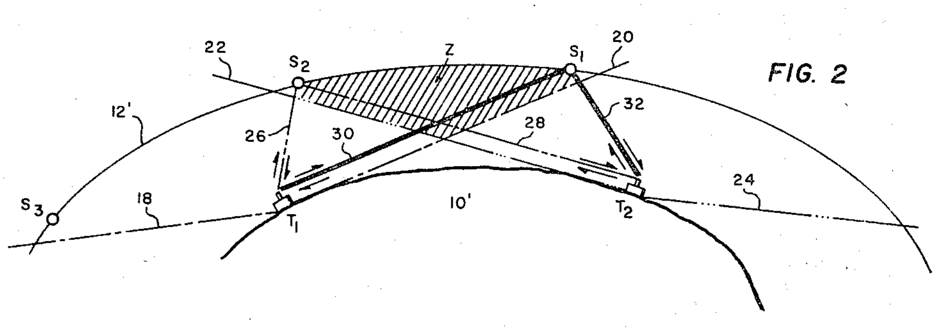
FIGURE 2 is a partial cross-sectional view of the earth and a portion of the atmosphere above the earth showing ground terminals and satellites, and bidirectional line-of-sight communication paths between each ground terminal and each satellite.
Figure 3:
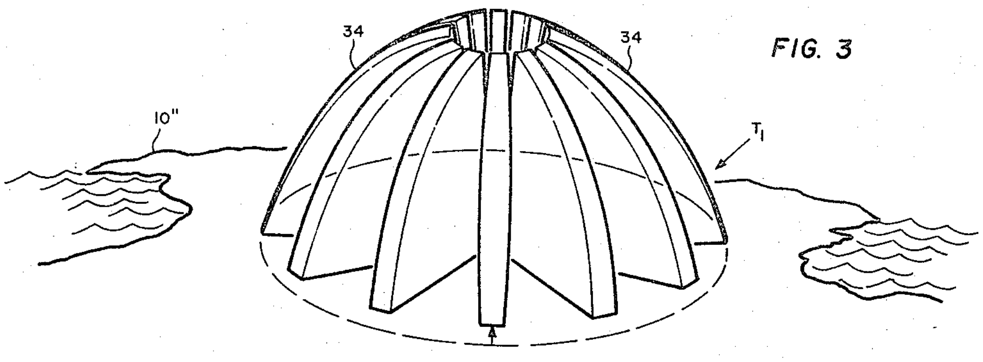
FIGURE 3 is an isometric view of a portion of the earth with the receive and transmit pattern of a preferred antenna array being graphically represented above the earth.

*Detailed description—FIGURES 1–3*

FIGURE 1 depicts an isometric view of the earth 10, and shows an equatorial orbit 12, polar orbit 14 and inclined orbit 16. Basically, the equatorial orbit 12 is one in which the plane of the orbital path is parallel to the plane of the equator; whereas the polar orbit 14 is one in which the plane of the orbital path is perpendicular to the plane of the equator. Accordingly, when the plane of the orbiting path is at an angle other than 90° to the plane of the equator, it is referred to as an inclined orbit. FIGURE 1 also shows the ascending node, which is one of the points along the common diameter of the orbital paths in which each path intersects. The other point of common diameter intersect is called the descending node (not shown) which is 180° displaced from the ascending node. The term ascending node as used here means that node which the orbiting satellite approaches as it traverses the southern hemisphere of the earth when it is in either a polar or an inclined orbit, and the other node is appropriately referred to as the descending node. The satellite repeaters of the present invention may be circling the earth in any one or more of the above-mentioned types of orbits.

FIGURE 2 shows a partial cross-section of the earth 10', with two ground terminals, $T_1$ and $T_2$, and three satellites, $S_1$, $S_2$ and $S_3$, shown in orbital path 12'. The field of view of ground terminal $T_1$ is graphically represented by lines 18–20, whereas the field of view of ground terminal $T_2$ is graphically represented by lines 22–24. Note here that the cross-hatched zone or section Z is the area of overlap of the field of views of ground terminals $T_1$ and $T_2$. Satellite $S_1$ is shown in a position in which it is about to leave the common zone Z, while satellite $S_2$ is in a position shortly after it entered common zone Z. Accordingly, since both satellites, $S_1$ and $S_2$, are in the common zone Z, ground terminal $T_1$ can communicate with ground terminal $T_2$ via communication link 30–32, which includes satellite $S_1$, or by communication link 26–28, which includes satellite $S_2$. Note that satellite $S_3$, at the moment, is only in the field of view of ground terminal $T_1$, and accordingly no communication link between ground terminals $T_1$ and $T_2$ is available via satellite $S_3$.

Let it be assumed at this point that ground terminals $T_1$ and $T_2$ are capable of simultaneously tracking satellites $S_1$ and $S_2$ and of simultaneously communicating with each other via satellites $S_1$ and $S_2$. Also assume that the satellites $S_1$ and $S_2$ are moving in a clockwise orbit. Accordingly, in order to provide continuous communication between the ground terminals, they must be capable of instantaneous "handover" from satellite $S_1$ to satellite $S_2$, when satellite $S_1$ leaves common zone Z. That is to say, assuming that the ground terminals $T_1$ and $T_2$ are first linked via bidirectional paths 30–32, the ground terminals $T_1$ and $T_2$ must switch to bidirectional paths 26–28 when satellite $S_1$ leaves common zone Z. As will be discussed later in greater detail, most prior known satellite communication systems require ephemeris data with respect to satellite position as a function of time in order to provide a satellite link between communicating ground terminals. The equipment necessary to develop such data is expensive and bulky to say the least. The present invention uniquely provides a satellite communication system capable of performing the foregoing functions and can do it without ephemeris data as to satellite position per unit of time.

FIGURE 3 shows an isometric view of a portion of the earth 10'' and a ground terminal generally indicated at $T_1$ which terminal includes a plurality of receive and transmit fan beams 34 graphically represented in a spaced position above the earth 10''. Note that the fan beams 34 are spaced above the horizon. This is a conventional practice whenever receiver noise due to ground temperature and pattern degradation are critical factors. Since the purpose and advantages of this practice are well known to those skilled in the art, no detailed explanation is included herein.

It should be noted here that FIGURES 1–3 have been included to merely assist in the following detailed description of the present invention.

Figure 4:
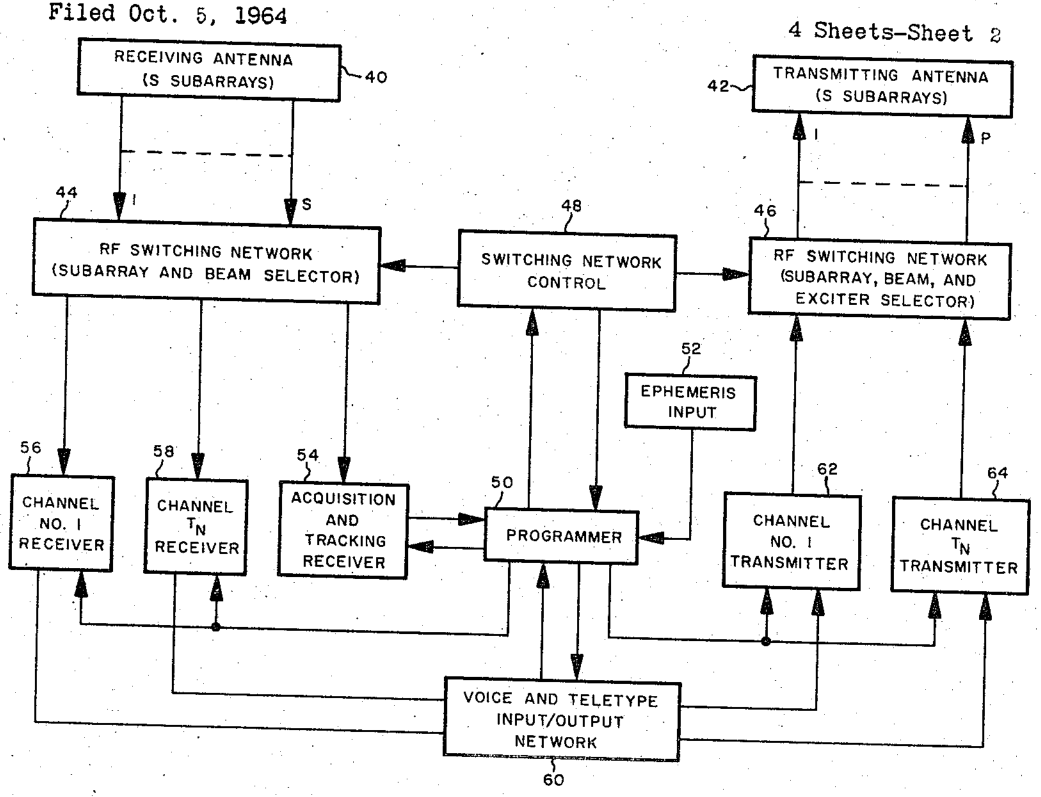
FIGURE 4 is a block diagram of a basic ground terminal in accordance with the present invention.

*Detailed description of FIGURE 4*

Referring to FIGURE 4, there is shown a block diagram of a basic embodiment of a ground terminal in accordance with the present invention. The receiving antenna 40 consists of a plurality of subarrays, each of which produces a number of independently steerable beams in space, such as that shown in FIGURE 3. These receiving subarray beams may be independently steered by any well-known phased array technique such as the type employing a serpentine frequency dispersive medium. Examples of well know serpentine type phased arrays are disclosed in U.S. Letters Patent Ser. No. 3,139,097, issued June 12, 1962, in the name of Strumivasser, et al., and in the Warren A. Birge patent application, Ser. No. 290,453, filed June 25, 1963, entitled, "Antenna Scanning System," which patent application is assigned to the assignee of the present invention. Each subarray of the receiving antenna 40 is designed to produce beams which are steered to cover a portion of the visible hemisphere. This plurality of subarrays produces a dispersal of beams, as illustrated in FIGURE 3, which can be independently steered to cover the entire visible hemisphere.

The RF switching network 44, which is coupled to the receiving antenna 40, selects the subarrays of the receiving antenna 40 in sequence, and samples all possible beam positions within each subarray coverage sector. Basically, the network 44 is searching for beacon signals of all satellites within the field of view of receiving antenna 40. This function of the system is called the acquisition mode. The RF switching network 44 is programmed, via the switching control network 48, by means of the programmer 50.

The acquisition and tracking receiver 54, which is coupled to the network 44, observes the signals present in each beam position of the receiving antenna 40, and upon detection of a satellite beacon signal of sufficient level, the acquisition and tracking receiver 54 decodes the signal. If an assigned satellite beacon code is detected by receiver 54, one of the channel receivers, 56, 58 . . . etc., is coupled via network 44 to the corresponding receiving antenna beam position of receiving antenna 40 by the programmer 50, thus enabling reception of intelligence transmitted by a remote ground terminal via the assigned satellite relay. Upon acquisition of a desired beacon code, the satellite transmitting this beacon is tracked throughout the region of mutual communication or common zone Z (note FIGURE 2) by the acquisition and tracking receiver 54, as described subsequently. This latter function of the system is referred to as the tracking mode.

Referring now to the right-hand portion of FIGURE 4, the transmitting antenna 42 consists of a plurality of arrays, preferrably equal in number to the receiving arrays, each of which produces a number of independently steerable beams in space, such as shown in FIGURE 3. These transmitting subarray beams are electronically steered by the same phased-array techniques previously referred to with regard to the receiving subarrays. Each subarray of the transmitting antenna 42 produces beams which are steered to at least cover that portion of the visible hemisphere which is covered by one of the receiving subarrays. This plurality of subarrays produces a dispersal of beams which also can be independently steered to cover the entire visible hemisphere.

Upon detection of an assigned satellite beacon signal of sufficient level, as described above regarding the acquisition mode, the switching control network 48 also steers the RF switching network 46 so as to select a specific transmitting subarray, a transmitting beam position, and one or more of the channel transmitters, 62, 64, etc., again under control of the programmer 50.

Programmer 50 programs the transmitting subarray and their beam positions in such a manner that the receiving and transmitting beams track their assigned satellite so as to continuously provide a duplex or two-way communication link between the calling ground terminal and the called ground terminal so long as their respective assigned satellite is in the common or mutual communication zone Z and the communicating ground terminals.

Each ground terminal of the system, also includes an ephemeris input 52 which provides pertinent satellite input data consisting of (1) assigned satellites (beacon codes) for each duplex communication link, (2) the order of satellite availability, and (3) assigned carrier frequencies for each duplex communication link. Note that no ephemeris data with respect to satellite position per unit of time is required. This is most advantageous since such data is continuously changing per unit of time, whereas the ephemeris data required in the present invention is preestablished and permanent.

While tracking an assigned satellite with its acquisition and tracking receiver 54, one ground terminal (calling terminal) may dial the telephone number, for example, of a remote ground terminal (called terminal) via the voice and teletype input/output network 60. Network 60 then turns on one of the channel transmitters 62, 64 . . . etc., for that particular communication, thus completing the ringing circuit and transmitting a ringing signal through the properly selected transmitting beam to the assigned satellite. The assigned satellite then relays the ringing signal to the remote ground terminal and a communication link is thereby established. This latter function of the system is referred to as the communicating mode.

It will be apparent here, that each ground terminal of the system advantageously provides (1) program means for independently controlling the scan of each fan beam of each subarray of both the receive and transmit arrays, (2) acquisition and tracking means for determining which satellite of the system is available for completing a communication link to a desired ground terminal, (3) channel receivers and transmitters sufficient to handle a plurality of simultaneous communications, (4) a capability to handle voice, teletype or other data, and (5) the ability to accurately acquire and track assigned satellites for establishing desired communication links between ground terminals, yet not requiring ephemeris data respecting satellite position per unit of time.

Figure 5:
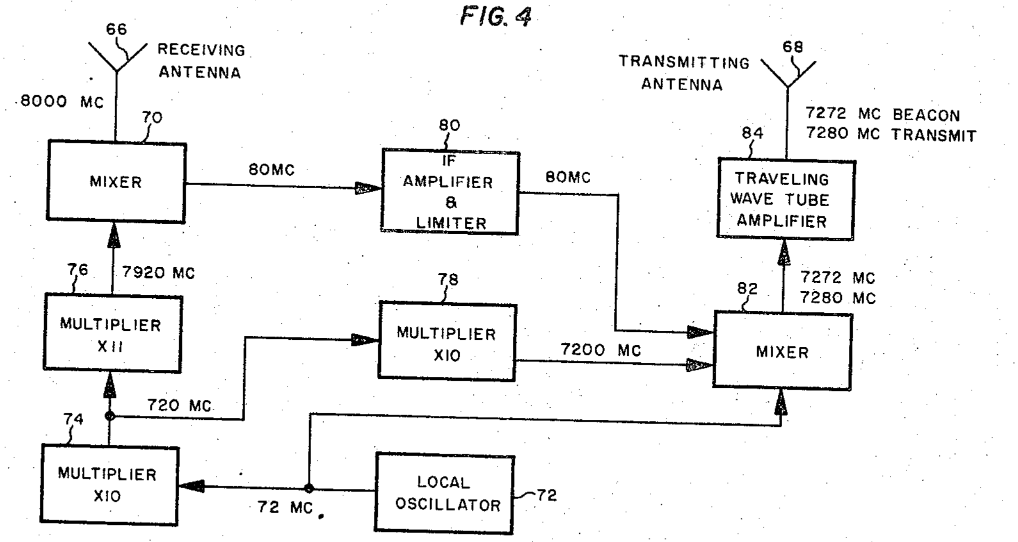
FIGURE 5 is a block diagram of a basic, prior art repeater utilized in orbiting satellites.

*Detailed description of FIGURE 5*

FIGURE 5 depicts a preferred embodiment of a satellite repeater which may be used in the satellite communication system of the present invention. Let it be assumed for exemplary purposes only that the repeater of FIGURE 5 is designed to receive 8000 mc. communication signals and to transmit 7280 mc. communication signals and a 7272 mc. beacon code frequency.

The satellite repeater comprises a receiving antenna 66, which is adapted to intercept any "up-link" signals (8000 mc.) transmitted by ground terminals within its field of view, and adapted to couple such signals to a conventional mixer 70 for developing an IF signal. The desired IF signal, e.g., 80 mc., is developed as follows. A local oscillator 72 of conventional design is provided for developing a 72 mc. frequency, which frequency is coupled to a conventional multiplier 74 wherein it is multiplied ten times for developing a 720 mc. frequency. This 720 mc. frequency is then coupled to a conventional multiplier 76 wherein it is multiplied eleven times for developing a 7920 mc. frequency, which latter frequency is coupled to the mixer 70. Mixer 70 is adapted to develop an output signal (80 mc.) which represents the difference between the signals (8000 mc.) received by the antenna 66 and the frequency (7920 mc.) developed by multiplier 76. The output (80 mc.) of mixer 70 is then coupled to the IF amplifier and limiter 80, wherein the IF signals are appropriately amplified and limited. The output of IF amplifier and limiter 80 is then coupled to the mixer 82.

The beacon (7272 mc.) and transmit (7280 mc.) signals are developed by (1) coupling the output frequency (72 mc.) of oscillator 72 to mixer 82, (2) coupling the IF signal (80 mc.) output of amplifier and limiter 80 to mixer 82, and (3) multiplying ten times the output frequency (720 mc.) of multiplier 74 in multiplier 78 and coupling this new frequency (7200 mc.) to the mixer 82. Mixer 82 is designed to develop two summation frequencies. The first being the summation of the output frequencies of multiplier 78 and IF amplifier and limiter 80 (7200+80=7280 mc.), and the second being the summation of the output frequencies of multiplier 78 and oscillator 72 (7200+72=7272 mc.). Thus, the output of mixer 82 will be a 7272 mc. beacon frequency and a 7280 transmit frequency, which frequencies are coupled to the traveling wave tube amplifier 84 wherein they are amplified and then coupled to the transmitting antenna 68 for retransmission to the appropriate ground terminal within the field of view of the satellite repeater.

It should be noted here that the beacon frequencies of all satellite repeaters are continuously transmitted and that each satellite repeater has its own identifying beacon code. Also, note that the transmit frequencies of any one satellite repeater is transmitted only after a signal is received by its antenna 66, and that there exists a separate transmit frequency for each channel of each satellite. Of course, the satellite repeaters may use any well known technique for providing plural channel capability in lieu of an independent channel for each communication link. It should also be understood that other types of satellite repeaters using other well known retransmission techniques may be substituted without departing from the spirit and scope of the present invention.

Figure 6:
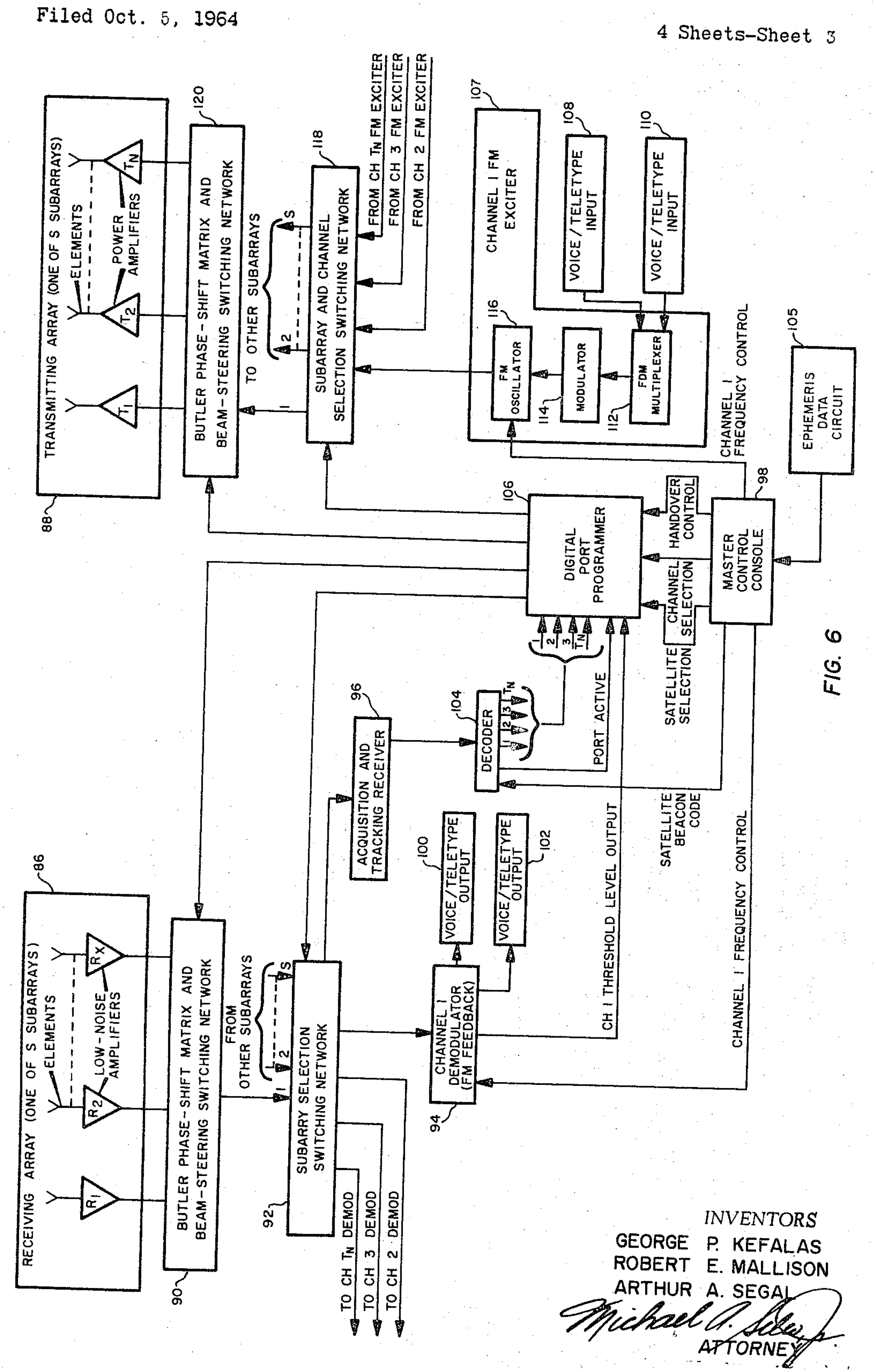
FIGURE 6 is a block diagram of a more detailed embodiment of a ground terminal in accordance with the present invention.

*Detailed description—FIGURE 6*

FIGURE 6 shows a block diagram of a detailed embodiment of a ground terminal in accordance with the present invention. To assist in the detailed description of FIGURE 6, let it be assumed that (1) the ground terminals of the system are separated by 3700 nautical miles maximum, (2) there are 24 stabilized orbiting satellites in random 5000 nautical mile circular orbits, (3) each satellite has an antenna gain of 11.4 db, (4) each satellite has transmitter power of 7.5 watts, and (5) each satellite has corresponding receive and transmit channels for duplex communication between ground terminals.

An ideal beam forming and beam steering technique for use in the present invention may employ a Butler phase-matrix in combination with both the receiving and transmitting arrays. Detailed descriptions of Butler type beam forming phased arrays are disclosed in the Butler and Lowe article entitled, "Beam Forming Matrix Simplifies Design of Electrically Scanned Antennas," appearing in the April 12, 1961, issue of Electronic Design, page 170, et seq.; the Shelton and Kelleher article entitled, "Multiple Beams From Linear Arrays," IRE transactions, volume AP–9, page 154, et seq., March 1961 issue; and the Delaney article entitled "RF Multiple Beam Forming Technique," IRE Transaction, volume MIL–6, page 179, et seq., April 1962 issue.

To further assist in the detailed description of FIGURE 6, reference may be made to the detailed description of an electronically steerable, ground based, antenna array system as set forth in the final report of U.S. Government Contract No. DA–36–039–AMC–02368 (E) dated October 1964, which was written in part by George P. Kefalas, one of the inventors of the present. Exemplary embodiments and detailed descriptions of the receiving (86) and transmitting (88) arrays, low-noise amplifiers (R), power amplifiers (T), Butler phase-shift matrix and beam-steering switching networks (90 and 120), subarray selection switching network (92), subarray and channel selection switching network (118), acquisition and tracking receiver (96), decoder (104), digital port programmer (104), channel demodulators (94), voice/teletype output circuits (100 and 102) master control console (98), channel FM exciters (107), voice/teletype input circuits (108 and 110) and techniques for providing ephemeris data to the programmer, are disclosed in the above-mentioned final report of October 1964.

Referring now in detail to FIGURE 6, the receiving array 86, represents one of the S linear subarrays of the system, with each subarray comprising X number of elements. Letting S equal 13 and X equal 64, then each subarray will contain 64 elements for a 7.0 gc. operation of the system. The 64 elements of the receiving array 86 are respectively connected to 64 low noise amplifiers, i.e., $R_1$ to $R_x$. The amplifiers $R_1$ to $R_x$, are connected to 64 corresponding ports of a Butler Phase-shift matrix and beam-steering switching network 90. In this respect, it will be apparent that each fan beam position of the receiving array 86 corresponds to an input port of the network 90, i.e., 64 beam positions per receive subarray. As illustrated in FIGURE 3, since the hemispherical coverage obtained with the 64 fan beams of each linear subarray covers a finite sector of the hemisphere, the 13 linear subarrays of the system divide the entire visible hemisphere into 832 beam positions. The number of fan beams in each linear subarray depends upon the spacing between subarray elements.

The 64 outputs of network 90 are coupled to 64 corresponding terminals of the subarray selection switching network 92, which in turn respectively connects the 64 beam positions of the receiving array 86 to an appropriate channel demodulator, such as demodulator 94. Note here, that only intelligence in channel 1 is processed for description purposes. Thus, one only of the network 92 channel outputs is depicted. Network 92 also includes an output which couples acquisition and tracking intelligence received by the system to the acquisition and tracking receiver 96.

One of the tasks of the digital port programmer 106 of each ground terminal, is to sequentially switch the networks 90 and 92 through the 64 ports of the receiving array 86, and to couple intelligence present at such ports to both the appropriate channel demodulator (94) and to the acquisition and tracking receiver 96 for determining the beam positions of all the satellites in the field of view of the receiving array 86. The operation of the programmer 106 is as follows:

The programmer 106 sequentially connects the acquisition and tracking receiver 96 to each output port of the network 90 of each subarray of the system via network 92. Note here that each subarray of the system includes a network similar to network 90 of FIGURE 6. When all ports of network 90 are sampled with respect to a particular receiving subarray, i.e., receiving array 86, the programmer 106 then commands network 92 to switch to another subarray of the system. Once again, all the ports of network 90 are sampled with respect to the newly selected subarray. Although any well known technique for sampling the ports of network 90 may be utilized, it has been established that a 20 microsecond sample time is satisfactory for testing each port. Therefore, if no signal is present in the port being sampled for approximately a 20 microsecond time interval, the programmer 106 will automatically switch the acquisition and tracking receiver 96 to the next output port of network 90 of the subarray being sampled. This sampling process continues until a signal is present in an output port, in which case, the sequence is delayed until the beacon code received is decoded by decoder 104. Decoder 104 is coupled between receiver 96 and programmer 106 and is controlled by the master control console 98. Master control console 98 may include on-off switches, override switches, ephemeris data, displays, system control information and other control data. If the beacon code is from a satellite that is assigned to one of the preferred communication links of the "calling" ground terminal, the port number, i.e., (beam position) of the receiving subarray 86 is either stored for future use, or used to switch the receiving channel demodulator 94 to the appropriate position of network 92.

Each ground terminal of the system is preferably equipped to simultaneously communicate with at least four other ground terminals, with each communication link between the ground terminals having a preassigned sequence of beacon codes. Accordingly, each two-way communication link has a particular satellite assigned during any given period of time. The assignment is made by the ephemeris input to the master control console 98, which lists a sequence of satellite beacon codes which are within the mutual field of view of the ground terminals desired to communicate. This ephemeris input may be placed on punched paper tapes, magnetic tapes or the like for providing automatic operation of the digital port programmer 106 with respect to satellite assignment.

The acquisition and tracking receiver 96 now tracks the progress of an assigned satellite across the mutually visible region of the communicating ground terminals, and sequentially connects the appropriate channel demodulator to the beam position (port) of networks 90 and 92 where the satellite's beacon code sequentially appears, while disconnecting receiver 96 from the presently used port when the signal level thereon has fallen below a predetermined value. The receiver 96 is indexed continuously through all ports, testing for signal strength and code, and completing the entire cycle in less than 0.7 second. Thus, once in each cycle the receiver 96 makes the decision whether to continue the present use of particular port (primary port) or to discontinue its use and commence use of another port (secondary port) wherein the signal has been found to be stronger. If the primary port signal level is satisfactory and the code validity continues, the programmer 106 retains the primary port connection but stores for subsequent use the address of all other ports upon which sufficient signal level and proper codes are present. The threshold level of the receiver 96 is higher than that of the channel demodulator 94, so that the receiver 96 is switched to its secondary port before the signal disappears in the primary port, thus assuring continuity. The time interval for a complete switching cycle, i.e., less than 0.7 second, is only a fraction of the time required by a satellite to transverse through one beamwidth.

The above described method of sequentially scanning network 90 by programmer 106, thus sequentially sampling all the ports of the subarrays for detecting the presence of the beacon code of a preassigned satellite, avoids the requirement of predicting and knowing the exact position of a satellite with respect to time and the positions of the comunicating ground terminals before a communication link between such ground terminals can be established. The only ephemeris data required in the present invention are the approximate time periods that satellites are in the mutual communicable regions of the communicating ground terminals. Thus, there is no requirement for precise time reference data for tracking and acquisition of the preassigned satellites. For this reason, an accuracy of plus or minus several minutes will suffice to assure visibility of the satellites.

The transmitter array 88 also consists of 13 linear subarrays (S equals 13), with each transmitting subarray containing 16 elements (N equals 16) to meet the gain requirements for 8 gc. "up-link" operation. The fan beams of the transmitting array 88 are preferably slightly broader than those of the receiving array 86, and should have fewer transmitting beam positions. There are, therefore, 208 beam positions for the complete transmitting array 88.

The 16 elements of the transmitting array 88 are respectively connected to 16 power amplifiers, i.e., $T_1$ and $T_N$. The amplifiers $T_1$ to $T_N$ are connected to 16 corresponding ports of a Butler phase-shift matrix and beam steering switching network 120. In this respect it will be apparent that each fan beam position of the transmitting array 88 corresponds to an output port of the network 120, i.e., 16 beam positions per transmit subarray. As illustrated in FIGURE 3, since the hemispherical coverage obtained with the 16 fan beams of each linear transmit subarray covers a finite sector of the hemisphere, the 13 linear transmit subarrays of the system divide the entire visible hemisphere into 208 beam positions. Again, the number of fan beams in each linear transmit subarray depends upon the spacing between subarray elements.

The 16 outputs of network 120 are coupled to 16 corresponding terminals of the subarray selection switching network 118, which in turn respectively connects the 16 beam positions of the transmitting array 88 to an appropriate channel exciter, such as exciter 107. Note here, that only intelligence in channel 1 is processed for description purposes. Thus, one only of the network 118 channel inputs is depicted. Each exciter also receives commands and data from the master control console 98.

Tracking of the receive and transmit beams under control of the digital port programmer 106 is accomplished by scanning the receive beam over four positions for every change in the transmit beam. The transmit beam position is also controlled by programmer 106 in response to changes in beam position of the receive array. The necessary relationship between the transmitting and receiving array patterns to permit precise beam tracking, is mathematically derived later in the description of FIGURE 6.

Accordingly, programmer 106 of each ground terminal sequentially switches the networks 118 and 120 through the 16 ports of the transmitting array 88, and couples intelligence from the channel exciters, such as channel exciter 107, to the appropriate port of the transmitting array 88 for transmission to the selected satellite. Note here, that programmer 106 commands and controls the transmitting beam positions in response to beam position changes of the receiving array 86.

Once the system of FIGURE 6 acquires and tracks a preassigned satellite, and the beams of the transmitting array 88 are scanned in synchronism with the beams of the receiving array 86, the system is conditioned for a communication with a remote ground terminal. Of course, the remote ground terminal is also similarly conditioned for communication.

For transmitting voice or teletype data, the voice and teletype input circuits 108 and 110 are energized by conventional techniques, and such data is coupled to the FDM multiplexer 112, which channels the data to the modulator 114. Modulator 114 conventionally modulates the FM oscillator 116, which is controlled by the master control console 98. The FM modulator carrier signals developed by the FM exciter 107 are then coupled to the appropriate port of the transmitting array 88 via networks 118 and 120, for transmission to the selected satellite.

When FM modulated carrier signals are received by the receiving array 86, they are coupled to the channel demodulator 94 via networks 90 and 92, wherein such carrier signals are demodulated in a conventional manner, and the demodulated data is reproduced by the voice and teletype output circuits 100 and 102.

The present invention is advantageously capable of automatically switching from one satellite to another as the one being presently used moves out of the mutual communicable region or zone of the communicating ground terminals. This feature is referred to in the art as instantaneous satellite handover. The satellite presently used in a communication link is called the primary satellite while other satellites in the mutual field of view of the communicating ground terminals are called secondary satellies. Handover to a secondary satellite is achived as follows:

As the receiver 96 tracks the primary satellite it also searches for a secondary satellite. The receiver 96 couples all beacon codes of available secondary satellites to the decoder 104, which selects one of the secondary satellites as the handover satellite. This beacon code is then stored in the programmer 106 for subsequent use when handover is to occur. At this point, one or all of the programmers of the communicating ground terminals determine that handover should occur and accordingly transmits a "handover ready" signal or code. Upon receipt of the "handover ready" signal by the communicating ground terminals, each acquires and tracks the secondary satellite.

As each of the communicating ground terminals acquire the secondary satellite, each transmits a "handover ready" signal, while simultaneously storing the secondary satellite beacon code into its programmer 106. At this point each communicating ground terminal begins transmitting and receiving via the new satellite. This handover feature of the present invention advantageously results in a negligible interruption of voice communication between communicating ground terminals. The communication interruption time occurring during handover is approximately equal to the difference in the propagation time over communication links using the primary and secondary satellites which can be sufficient to affect digital data communications at high data rates.

Table 1 is included at this point to assist in the remaining description of the present invention. Typical power budgets for ground terminals operating at different "up-link" and "down-link" frequencies are shown in Table 1. The system parameters listed in Table 1 are currently achievable, and all required components are well within the present state-of-the-art.

Table 1, which is included next below, shows that a gain of 31 db is required for the receiving array 86 at the maximum slant range (approximately 7,270 nautical miles for a 5,000 nautical mile circular orbit), when operating at 7 gc. and allowing for a foul weather operating margin. Thirteen linear receiving subarrays, each with 64 left-hand circularly polarized elements, fulfill the gain requirements in an optimum manner at 7 gc. The elements may be typically of the spiral, horn, or crossed-dipole types.

TABLE 1. POWER BUDGET

| | Down-Link | | Up-Link | |
|---|---|---|---|---|
| | 4 gc. | 7 gc. | 6 gc. | 8 gc. |
| Power Transmitted, dbm | +41.8 | +41.8 | +70 | +70 |
| Transmit Antenna Gain, db | +11.4 | +11.4 | +21.5 | +25.0 |
| System Losses, db | −5.85 | −5.85 | −2.85 | −2.85 |
| Atmospheric Losses (4 mm./hr.), db | −1.8 | −2.3 | −2.0 | −2.6 |
| Free Space Loss,[1] db | −188 | −192.7 | −191.2 | −193.7 |
| Receive Antenna Gain, db | +24.5 | +31.0 | +11.4 | +11.4 |
| Received Signal Power, dbm | −118 | −116.7 | −93.2 | −92.8 |
| Signal Channel Noise, db | +43.8 | +43.8 | +60 | +60 |
| Bandwidth | 24 kc. | 24 kc. | 1 mc. | 1 mc. |
| $KT_e$, dbm./c.p.s | −171.2 | −170.2 | 169.7 | −169 |
| Receiver Noise Power, dbm | −127.4 | −126.4 | −109.7 | −109.0 |
| Carrier to Noise Ratio (C/N),[2] db | 9.4 | 9.7 | 16.5 | 16.2 |
| C/N Threshold, db | [3] 6 | [3] 6 | [4] 12.0 | [4] 12 |
| Margin (4 mm./hr. rainfall), db | 3.4 | 3.7 | 4.5 | 4.2 |
| Clear-Weather Margin, db | 5.2 | 6.0 | 6.5 | 6.8 |

[1] 5,000 nautical mile orbit, 7.5° minimum elevation angle.
[2] Referred to Noise Bandwidth.
[3] FMFB, M=3, 1.3 db above theoretical threshold.
[4] Conventional FM M=3.

As will be noted from Table 1 above, the gain (G) of an optimum array is determined by the total number of elements (N), the gain of the individual elements ($G_e$), and the aperture distribution function in accordance with the following relationship:

$$G = NG_eA \tag{1}$$

The parameter A is a constant determined only by the aperture distribution function; maximum $A=1$ for a uniform aperture distribution. The element gain is related to the solid angle element beamwidth (Ω) and the element aperture efficiency (K) by:

$$G_e = \frac{K4\pi}{\Omega} \tag{2}$$

For full hemispherical coverage, a single array would require elements capable of $2\pi$ steradians coverage and would result in a large number of elements, thus making the array size and complexity incompatible with the requirement of a transportable system. Also, elements of $2\pi$ steradians coverage are impractical. An array of subarrays is preferable with each subarray covering a subsector of the hemisphere, and implemented such that it is suitable for a transportable system. An array of linear subarrays are used to provide coverage from the minimum elevation angle (7.5 degrees) to the zenith region, over the entire 360 degrees of azimuth. A number of linear subarrays, each producing fan beams which can be independently steered in the azimuth, can provide hemispherical coverage as shown in FIGURE 3. Obviously, it is important to limit the number of elements required per subarray in the interest of minimizing the beam-forming and beam-steering network complexity for greater transportability. A 64-element Butler phase-matrix is considered to be a practical limit in terms of implementation, complexity and cost. Thus a 64-element linear array is representative of the upper limit in array complexity for this application.

The solid angle coverage of an array of identical elements is equal to the element beam width (Ω). From Equations 1 and 2, it can be seen that:

(3)
$$\Omega=\frac{ANK4\pi}{G}$$

Now, considering a receiving array design at 7 gc. we find from Table 1 that the required gain is about 31.0 db for $P_{ts}=15$ watts where $P_{ts}$ equals the satellite transmitter power level. If each linear subarray of the overall array produces elevation fan beams covering the elevation angle range from 7.5 to 90 degrees, there results a considerable overlap or cross over of beams in the zenith region. This means that the subarray is wasteful of gain and, hence, unnecessarily complex. However, a separate subarray may be used for coverage of the zenith region, thereby rebuiring less elevation coverage and fewer elements for the "side" subarrays. The subarray for overhead coverage requires about 2.5 db less gain than the side subarrays because of the decreased slant range to the zenith region. For the 7 gc. design example the overhead subarray requires approximately 28.5 db gain (31.0–2.5). Using $A=1$, $N(\max)=64$, and $K=0.8$ in Equation 3, then:

$$\Omega_{side}=\frac{643}{G_{side}}=0.510 \text{ steradian, for } G_{side}=31 \text{ db}$$

and $$\Omega_{over}=\frac{643}{G_{over}}=0.846 \text{ steradian, for } G_{over}=28.5 \text{ db}$$

The solid angle coverage of each subarray may be approximated accurately by (4)
$$\Omega=(2\theta_{AZ})\left(\sin\frac{\theta_{EL}}{2}\right)$$

where $\theta_{AZ}$ and $\theta_{EL}$ are the half-power azimuth and elevation element beamwidths, respectively. Then the coverage sector of the overhead subarray is approximately 54° by 54° ($\theta_{AZ}$ by $\theta_{EL}$), and each side subarray must provide an elevation coverage from 7.5° to about 63°, or $\theta_{EL}\approx 56°$. From Equation 4 and $\Omega_{side}=0.510$, the required azimuth scan angle (and element beamwidth) for each side subarray is $\theta_{AZ}\approx 30°$. That is, a total of twelve linear side subarrays, each having 30° by 56° coverage, and one 54° x 54° coverage overhead subarray are required. The length of each subarray is given by (5)
$$L=(N-1)d$$

whereby when N equals 64 and the element spacing $d$ equals 2 wavelengths, the subarray lengths are about 18 feet at 7 gc. If a larger element spacing is desirable for inserting the array amplifiers an element spacing of $d$ equals 3 wavelengths would result in the subarray length (L) being about 27 ft. at 7 gc. It is interesting to note here that a somewhat lengthier subarray poses no problems in assembly and disassembly because the subarray may be easily segmented. Also note, that no alignment problems occur when the overall length of the subarray (L) is less than about 30 ft.

The corresponding transmitting array preferably operates at a somewhat higher frequency (about 8 gc.) than the receiving array so as to permit adequate isolation between transmitter and receiver while taking advantage of the lower atmospheric attenuation for the receiving "down-link" frequency. The transmitting array requires the same number of subarrays as the receiving array with each subarray having the same subsector coverage to permit simple beam tracking during the communication mode. However, the transmitting array does not require as much gain as the receiving array, and is, therefore, much smaller than the receiving array.

The transmitting subarrays are preferably designed with 16 right-hand, circularly polarized elements spaced 2 wavelengths apart, with each element respectively connected to 16 power amplifiers, for an 8 gc. "up-link" operating frequency. Since the transmit subarrays have fewer elements than the receiving subarrays, the fan beams formed by the transmitting subarrays are wider in azimuth than the fan beams formed by the receiving subarrays. In the example of FIGURE 6, the beamwidth of the transmit array fan beams are 4 times wider than the beamwidth of the receive array fan beams. This is so because there are 4 times more elements in the receive array than in the transmit array. The transmit antenna elements may be either of the well known horn, spiral or cross-dipole type antenna elements.

The Butler phase-matrix 120 among its 16 output ports equally distributes the RF signal to be transmitted over a selected channel, and established the required signal phase between outputs so as to point the transmit subarray fan beam in a proper direction. By connecting 1.25 kw. power amplifiers at each of the output ports of the Butler phase-matrix 120, the total power in any one fan beam is approximately 20 kw. maximum. If two signals are connected simultaneously to any two input ports of the transmitting Butler-phase matrix 120, there will be formed two beams of about 10 kw. each. This configuration permits communicating with two different ground stations with one subarray. In normal system usage, a separate subarray would be used for each satellite or communication link. It will be apparent here that if only one 10 kw. signal is to be transmitted by one subarray, merely half the input power is required, thus providing power saving. Each transmitter amplifier requires approximately 7 kv. at 550 milliamperes for maximum output. Therefore, a total input power of about 61.6 kw. is required for two 10-kw. signals from one subarray, or 30.8 kw. input power for one 10-kw. output signal. The total input power is 123.2 kw. when four 10-kw. signals are to be transmitted simultaneously. The phase difference between any of the 16 power amplifiers on each subarray of array 88 should be within ±10 degrees, to prevent serious degraduation of sidelobe level. This phase control requirement is well within the state-of-the-art. Further, the gain variations between the power amplifiers should be below ±1 db to also prevent sidelobe level degradation. This gain control can be achieved by using a common power supply for the power amplifiers on each subarray.

The receiving and transmitting beams of subarrays 86 and 88 may be synchronously scanned by maintaining the instanteous spatial orientation of the transmit array grating-lobe pattern superimposed with that of the receiving array grating-lobe pattern. This beam pointing synchronization can be achieved by designing the two arrays 86 and 88 so that they provide equal grating-lobe spacing. The transmit array must be mechanically aligned with the receive array before the switching network 90 and 92 can be used to provide beam steering intelligence to the transmit array 88 via programmer 106.

It should be noted here that for optimum performance it is desirable that the transmit grating lobe angular spacing be equal to the receive grating lobe angular spacing. It has been established that this condition is achieved when the ratio of the receive-to-transmit element spacing equals the ratio of receive-to-transmit wavelengths. A derivation of the foregoing premise follows:

It is well known in the art that the pattern maxima of an antenna occur when the denominator of the space factor equals zero. Thus, for an antenna having uniform illumination, the pattern maxima occur when, (6) $$\tfrac{1}{2}(P_1+P_2)=\pm K\pi$$

where, $K=0, 1, 2 \ldots$ etc.,
$P_1=2\pi D/\lambda \sin \theta$,
$P_2=2\pi D/\lambda_g$, and
$\lambda$=freespan wavelength,
$\lambda_g$=guide wavelength,
$D$=element spacing, and
$\theta$=angle off boresight.

The grating-lobe spacing or angular separation between maxima occurs when the space factor denominator changes by radians.

Then, $$d(P_1+P_2)=D/\lambda(\cos \theta)d\theta=\pi$$

and the grating-lobe spacing (S) is, $$S=d\theta=\lambda/D \cos \theta$$

For equal receive and transmit array grating-lobe spacing, $$S_T=S_R,$$

thus, $$\frac{\lambda_T}{D_T \cos \theta}=\frac{\lambda_R}{D_R \cos \theta}$$

therefore, (7) $$\frac{D_R}{D_T}=\frac{\lambda_R}{\lambda_T}$$

where, $S_T$=transmit grating lobe spacing
$S_R$=receive grating lobe spacing
$\lambda_T$=transmit wavelength
$\lambda_R$=receive wavelength
$D_T$=transmit element spacing
$D_R$=receive element spacing As stated above, when the ratio of receive-to-transmit element spacings equals the ratio of receive-to-transmit wavelengths the transmit and receive grating lobe angular spacings are equal, as shown by Equation 7.

Since the transmit and receive frequencies or wavelengths ($\lambda_T$) and ($\lambda_R$) are essentially constant for all satellites, the ratio $\lambda_R/T$ must be held constant, see Equation 7, so that the transmit and receive arrays of each ground terminal may be used in communication links in which any one of the satellites of the systems are included.

It will be apparent from the foregoing detailed description of the preferred embodiment of the ground terminal of FIGURE 6, that the combined utilization of a linear grating lobe antenna array and a Butler phase-shift matrix enables accurate acquisition and tracking of the repeater satellites of the system in a relatively simplified implementation readily controllable by a state-of-the-art digital port programmer for establishing a plurality of communication links between ground terminals of the system. Of course, the above set forth advantageous features of the ground terminal depicted in FIGURE 4 are equally achieved by the ground terminal of FIGURE 6.

*Detailed description—FIGURES 7–10*

FIGURES 7 and 8 respectively depict on exemplary ground terminal antenna array and its dimensional characteristics for both the receive and transmit subarrays, which may be utilized in the satellite communication system of the present invention, whereas FIGURES 9 and 10 respectively depict another exemplary antenna array and its dimensional characteristics also applicable in the present invention.

In FIGURES 7 and 8, the optimum antenna configuration and dimensional characteristics for a 7 gc. "down-link" and an 8 gc. "up-link" antenna system are graphically represented. Basically, the twelve linear subarrays (side 117 and the one linear subarray (over) 119, each of length L (see FIGURE 8), provide coverage of the entire visible hemisphere. FIGURE 8 sets forth the gain (db) for both the side and over subarrays 117 and 119, the number of elements (N) per subarray, the total number of elements ($N_{Total}$) per antenna array, and the length (L) of each antenna array, each for the 7.0 gc. "down-link" and 8.0 gc. "up-link" frequencies.

In this optimum antenna array, each receiving subarray 117 and 119 has elements spaced two to three wavelengths apart so as to form a grating of fan beams. For a two wavelength element spacing, the overhead subarray 118 forms three grating lobes over its coverage sector, with each grating lobe being a fan beam approximately 54 degrees by 0.40 degree beamwidth, whereas each side subarray 117 forms two grating lobes for two wavelength element spacing, with each grating lobe having a 56 degrees by 0.40 degree beamwidth. The subarray elements and their associated amplifiers may be mounted on an 18 foot aluminum frame, when using a two wavelength element spacing, and the frame may be divided into three sections to facilitate handling.

FIGURE 8 also sets forth a non-optimum 4 gc. "down-link" and 6 gc. "up-link" antenna system to exemplify that the required number of elements per antenna array decreases as the carrier frequency is reduced, i.e., number of total elements is a function of carrier frequency, when the same number of linear subarrays 117 and 119 are used.

In FIGURES 9 and 10, the optimum antenna configuration and dimensional characteristics for a 4 gc. "down-link" and a 6 gc. "up-link" antenna system are shown. Basically, the 4 linear subarrays (side) 121 and the one linear subarray (over) 123, each of length L (see FIGURE 10), provide coverage of the entire visible hemisphere. FIGURE 10 sets forth the gain (db), the number of elements, both per subarray (N) and per antenna array ($N_{Total}$), and the length (L) of the antenna array, each for the 4.0 gc. "down-link" and the 6.0 gc. "up-link" frequencies. This optimum 4/6 gc. antenna configuration assumes a maximum of 32 receiving array elements, so that the overall subarray length (L) is comparable to that obtained with the optimum 7/8 gc. antenna configuration of FIGURES 7 and 8.

It is to be understood, that the specific antenna configurations of FIGURES 7–10 are merely exemplary, and any other well linear array antenna design may be substituted without departing from the spirit and scope of the present invention.

*Detailed description of FIGURE 11*

A typical layout of an optimum 7/8 gc. electronically steerable antenna array for a ground terminal of the present invention, is illustrated in FIGURE 11. The ground terminal basically consists of a receiving array 122–124, a transmitting array 126–128, transmitter equipment shelter 130, waveguide lines 132–134, central equipment and control center 136, and diesel generator primary power sources 138.

Twelve receiving side subarrays 122 surround the receiving overhead subarray 124 in such a manner that substantially complete hemispherical coverage is obtained. Each subarray support frame is approximately 18 ft. long, and each is divided into three sections to facilitate handling; the center section is typically about six feet long, one foot wide and two feet high for support of the subarray and to house the Butler phase matrix, switching matrix and amplifier power supply. The overhead subarray housing is preferably larger so that the subarray switching matrix, two local oscillators with power supplies, a multiplexer, and five mixers may also be accommodated. Waveguide lines 131 connect each of the twelve side subarrays 122 to the central overhead subarray 124, which in turn couples intelligence to the control center 136 via waveguide 132.

The transmitting array of FIGURE 11 consists of 12 transmit side subarrays 126 and one transmit overhead subarray 128, which are arranged so that each subarray covers the identical sector of the visible hemisphere as its corresponding receiving subarray. The transmit overhead subarray 128 is attached to the roof of the shelter 130, which contains the necessary power supplies and FM exciter equipment required for the transmitters. The transmitting array equipment housed in shelter 130 is controlled from the control center 136 via line 134. Each subarray 126 and 128 are preferably 3.75 feet long.

The central equipment and control shelter 136 is located between the receiving and transmitting arrays. This shelter houses most of the receiver equipment and the master control console. The master control console monitors all the subsystems via lines 132 and 134.

The overall array ground terminal of FIGURE 11 may be designed in modular form to make it readily transportable by cargo type helicopters or aircraft to any location in the world. The maximum unit design weight therefore should be less than 5000 pounds, with maximum unit size of about 142 inches by 84 inches.

It will be apparent from the foregoing detailed description that the present invention uniquely provides the following advantageous features:

(1) A system which provides rapid volumetric scanning of the visible hemisphere for acquisition (in a rapid passive mode) of airborne or spaceborne vehicles in a global communications system using active satellite or airborne vehicles.

(2) A system for rapidly and simultaneously acquiring and tracking a large number of airborne or spaceborne vehicles so as to establish many communication links between widely separated ground terminals, while utilizing a common inertialess antenna array. The acquisition and tracking function of the system can be performed without the usual need for an ephemerides or calendar on vehicle position as a function of time, and, hence, without requiring the coordinate transformation of such data when the ground terminals of the system are moved to a new site.

(3) A system for achieving instantaneous "handover" from one satellite or airborne vehicle to another for achieving continuous or uninterrupted communications between widely separated ground terminals.

(4) A system for providing rapid volumetric scanning of the visible hemisphere with a relatively simple antenna configuration of linear arrays, each array producing a set of grating-lobe fan beams which can be independently scanned. The use of linear arrays desirably eliminates the requirement for two-dimensional steering and tracking mechanisms, and the use of large spacing between array elements significantly minimizes the total number of elements required for a given gain and beamwidth. The large interelement spacing of each array greatly decreases array complexity, and thus, reduces the cost of the overall communications ground terminal with respect to a ground terminal using conventional arrays of nominal half-wavelength element spacing. This grating lobe array technique also permits beamwidth adjustment independently of gain.

(5) A system for automatically acquiring and tracking active airborne or spaceborne vehicles with optimum directivity and gain, and for redirecting the transmitting antenna beams of optimum directivity and gain to the tracked vehicles for relaying to remote earth terminals.

(6) A system for spatially synchronizing separate receiving and transmitting fan beams for achieving communications with remote ground terminals via airborne or spaceborne repeater relays, whereby the use of separate receiving and transmitting arrays advantageously permit design flexibility in (a) achieving large transmit-to-receive antenna isolation without a complex diplexer or its associated losses, (b) sidelobe level control, and (c) overall antenna implementation simplicity.

The terms and expressions which have been employed herein are used as terms of description and not of limitation and it is not intended, in the use of such terms and expressions, to exclude any equivalents of the features shown and described, or portions thereof, but it is recognized that various modifications are possible within the scope of the present invention.

Without further elaboration, the foregoing is considered to explain the character of the present invention so that others may, by applying current knowledge, readily adapt the same for use under varying conditions of service while still retaining certain features which may properly be said to constitute the essential items of novelty involved, which items are intended to be defined and secured by the appended claims.

What is claimed is:

1. A satellite communication system of the type in which a plurality of transportable ground terminals positioned on the earth's surface are inter-linked for communication by a plurality of repeater satellites orbiting about the earth, said system comprising:

(a) means for scanning and tracking said satellites over the visible hemisphere without requiring ephemeris data of satellite position with respect to time;
(b) means for simultaneously establishing a plurality of inter-communication links between preselected groups of said ground terminals; and
(c) means for providing handover from satellite to satellite as each satellite moves out of the field of view of any of said groups of communicating ground terminals.

2. A satellite communication system of the type in which a plurality of transportable ground terminals positioned on the earth's surface are inter-linked for communication by a plurality of repeater satellites orbiting about the earth, said system comprising:

(a) antenna means in each of said ground terminals, said antenna means providing receive and transmit patterns which are capable of scanning and tracking said satellites over the visible hemisphere without requiring ephemeris data of satellite position with respect to time;
(b) control means in each of said ground terminals for steering said receive and transmit patterns so as to simultaneously establish a plurality of inter-communication links between preselected groups of said ground terminals;
(c) detection means in each of said ground terminals for developing a handover signal immediately prior to the time that a satellite of any one of said inter-communication links moves out of the field of view of the corresponding group of communicating ground terminals, said handover signal being transmitted to all of said communicatinp ground terminals for providing handover from satellite to satellite.

3. A satellite communication system of the type in which a plurality of transportable ground terminals positioned on the earth's surface are interlinked for communication by a plurality of repeater satellites orbiting about the earth, said system comprising:

(a) antenna means in each of said ground terminals, said antenna means providing receive and transmit patterns which are capable of scanning and tracking said satellites over the visible hemisphere without requiring ephemeris data of satellite position with respect to time;
(b) control means in each of said ground terminals for steering said receive and transmit patterns so as to simultaneously establish a plurality of intercommunication links between preselected groups of said ground terminals;
(c) receiver means in each of said ground terminals for independently detecting and reproducing intelligence respectively received over said intercommunication links;

(d) transmitter means in each of said ground terminals for independently transmitting intelligence respectively over said intercommunication links; and (e) detection means in each of said ground terminals for developing a handover signal immediately prior to the time that a satellite of any one of said intercommunication links moves out of the field of view of the corresponding group of communicating ground terminals, said handover signal being transmitted by said transmitter means to all of said communicating ground terminals for providing handover from satellite to satellite.

4. A satellite communication system in accordance with claim 3 wherein:

(a) said antenna means is a linear, phased array antenna network comprising a plurality of subarrays, each of which produces a plurality of independently steerable fan beams.

5. A satellite communication system in accordance with claim 4, wherein:

(a) said control means includes a Butler phase-shift matrix and beam-steering switching network controlled by a digital port programmer.

6. A satellite communication system in accordance with claim 5 wherein:

(a) said receiver means is an FM demodulator; and (b) said transmitter means is an FM exciter.

7. A satellite communication system in accordance with claim 6 wherein:

(a) said detection means includes an acquisition and tracking receiver controlled by said programmer.

8. A satellite communication system of the type in which a plurality of transportable ground terminals positioned on the earth's surface are interlinked for communication by a plurality of repeater satellites orbiting about the earth, said system comprising:

(a) means in each of said satellites for continuously transmitting an identifying signal so as to distinguish each satellite from each other satellite;

(b) antenna means in each of said ground terminals for providing receive and transmit fan beams which are capable of scanning over the visible hemisphere and tracking any of said satellites which are in the field of view of said ground terminals without requiring ephemeris data of satellite position with respect to time;

(c) control means in each of said ground terminals for synchronously steering said receive and transmit fan beams over the visible hemisphere, thereby searching for all satellites in the field of view of said ground terminals and establishing a plurality of intercommunication links between preselected groups of said ground terminals;

(d) acquisition and tracking receiver means for decoding all identifying signals received by said antenna means and coupling to said control means the identifying signal of only those satellites of the system which are capable of interlinking a preselected group of said ground terminals over one of said intercommunication links;

(e) a plurality of demodulator means corresponding in number to the number of said intercommunication links, for independently detecting and reproducing intelligence respectively received by said antenna means over said intercommunication links; and (f) a plurality of transmitter means corresponding in number to the number of said receivers, for independently developing intelligence to be respectively transmitted by said antenna means over said intercommunication links.

9. A satellite communication system of the type in which a plurality of transportable ground terminals positioned on the earth's surface are inter-linked for communication by a plurality of repeater satellites orbiting about the earth, said system comprising:

(a) a transmitter in each of said satellites for continuously transmitting a beacon code so as to distinguish each satellite from each other satellite;

(b) a linear, phased-array, antenna network in each of said ground terminals for providing a plurality of receive and transmit fan beams which are capable of scanning over the visible hemisphere and tracking any of said satellites which are in the field of view of said antenna network without requiring ephemeris data of satellite position with respect to time, said antenna network having a plurality of receive and transmit ports respectively corresponding to the number of said receive and transmit fan beams;

(c) a programmer in each of said ground terminals for synchronously steering said receive and transmit fan beams over the visible hemisphere, thereby searching for all satellites in the field of view of said ground terminals and establishing a plurality of intercommunication links between preselected groups of said ground terminals;

(d) a first switching network controlled by said programmer for sequentially sampling each of said receive ports, said switching network having a plurality of output ports respectively corresponding to said receive ports;

(e) an acquisition and tracking receiver coupled to said first switching network for decoding all beacon codes received by said antenna network and coupling to said programmer the beacon code of only those satellites of the system which are capable of interlinking any preselected group of said ground terminals over one of said intercommunication links;

(f) a plurality of demodulators respectively connected to said output ports of said first switching network for independently detecting and reproducing intelligence respectively received by said antenna network over said intercommunication links;

(g) a plurality of transmitters corresponding in number to the number of said receivers, for independently developing intelligence to be respectively transmitted by said antenna network over said intercommunication links; and (h) a second switching network having a plurality of input and output ports corresponding in number to the number of said transmitters, said second switching network input ports being respectively coupled to said transmitters and said second switching network output ports being respectively coupled to said transmit ports of said antenna network, thereby respectively coupling said intelligence to be transmitted to said intercommunication links.

10. A satellite communication system of the type in which a plurality of transportable ground terminals positioned on the earth's surface are interlinked for communication by a plurality of repeater satellites orbiting about the earth, said system comprising:

(a) a transmitter in each of said satellites for continuously transmitting a beacon code which distinguishes each satellite from each other satellite;

(b) an antenna network in each of said ground terminals for providing a plurality of receive and transmit fan beams which are capable of scanning over the visible hemisphere and tracking any of said satellites which are in the field of view of said ground terminal without requiring ephemeris data of satellite position with respect to time, said antenna network having a plurality of receive and a plurality of transmit ports;

(c) a programmer in each of said ground terminals for synchronously steering said receive and transmit fan beams over the visible hemisphere, thereby searching for all satellites in the field of view of said ground terminals and establishing a plurality of intercommunication links between preselected groups of said ground terminals;

(d) a first switching network having a plurality of input and output terminals and a beacon code output terminal, said input terminals being respectively coupled to said receive ports, said output terminals being respectively coupled to a plurality of demodulators and said beacon code output terminal being connected to an acquisition and tracking receiver, said first switching network being controlled by said programmer so as to sequentially sample each of said receive ports;

(e) said acquisition and tracking receiver decoding all beacon codes received by said antenna network and coupling to said programmer the beacon code of only those satellites capable of interlinking any preselected group of said ground terminals over one of said intercommunication links;

(f) said demodulators independently detecting and reproducing intelligence respectively received by said antenna network over said intercommunication links;

(g) a plurality of transmitters corresponding in number to the number of said receivers for independently developing intelligence to be transmitted by said antenna network over said intercommunication links; and (h) a second switching network having a plurality of input and output terminals, said input terminals being respectively coupled to said transmitters and said output terminals being respectively coupled to said transmit ports, thereby respectively coupling said intelligence to be transmitted to said intercommunication links.

11. A satellite communication system in accordance with claim 10, and further including:

(a) detection means in each of said ground terminals for developing a handover signal immediately prior to the time that a satellite of any one of said intercommunication links moves out of the field of view of the corresponding group of communicating ground terminals, said handover signal being transmitted to all of said communicating ground terminals for providing handover from satellite to satellite.

12. A satellite communication system in accordance with claim 10 wherein:

(a) said antenna network includes a plurality of linear, phased-array antenna subarrays which produce a plurality of independently steerable receive and transmit fan beams.

13. A satellite communication system in accordance with claim 12 wherein:

(a) said programmer is a digital port programmer.

14. A satellite communication system in accordance with claim 13, wherein:

(a) said first and second switching networks each include a Butler phase-shift matrix and beam-steering switching network.

15. A satellite communication system in accordance with claim 14 wherein:

(a) said demodulators are FM demodulators; and (b) said transmitters are FM exciters.

References Cited

UNITED STATES PATENTS 3,262,116 7/1966 Hutchinson et al. ---- 343—100

RODNEY D. BENNETT, *Primary Examiner.*

CHESTER L. JUSTUS, *Examiner.*

D. C. KAUFMAN, *Assistant Examiner.*